June 16, 1959        R. E. FEARON        2,891,215
METHOD AND APPARATUS FOR ELECTRIC WELL LOGGING
Filed Nov. 13, 1956        5 Sheets-Sheet 1
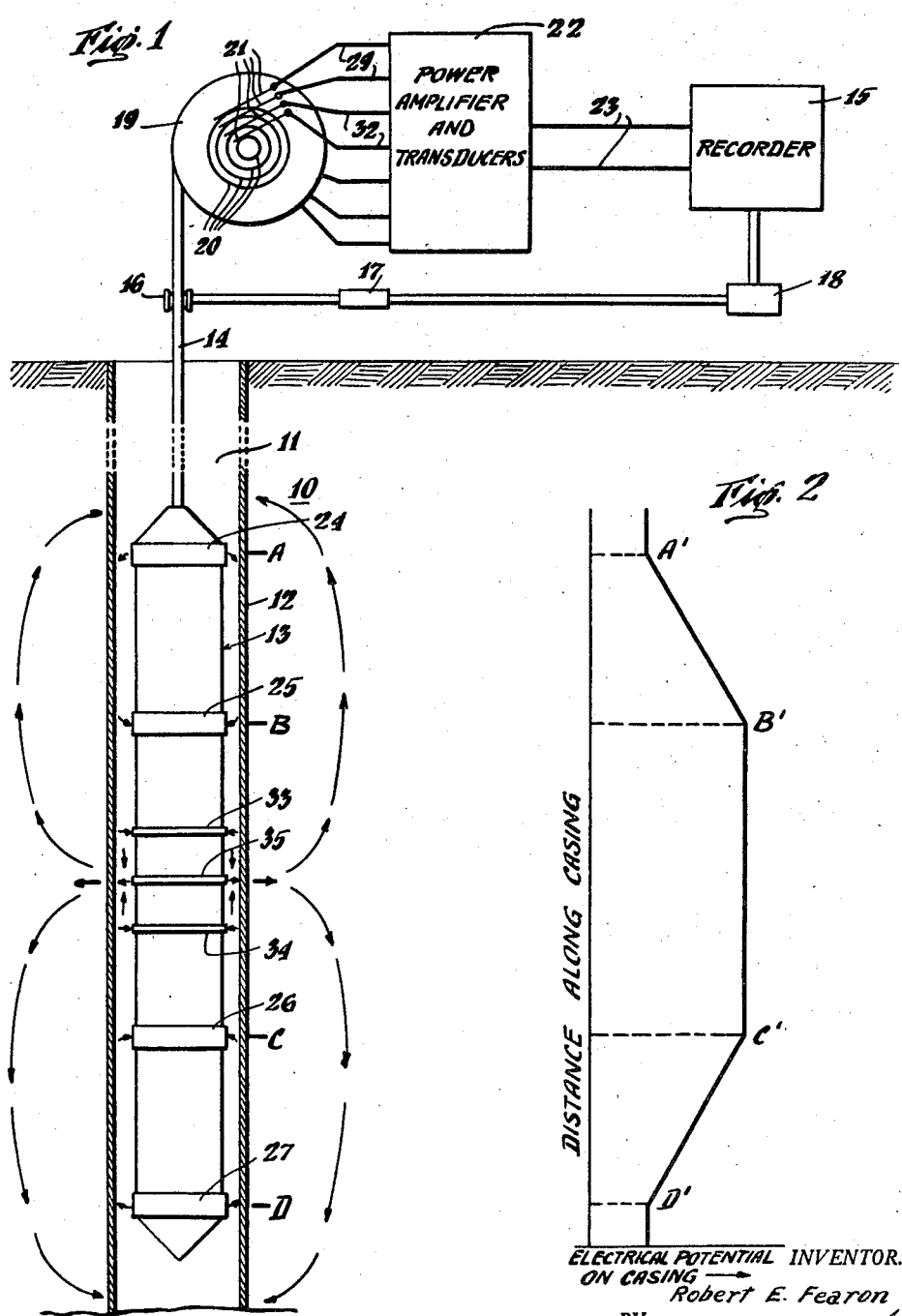
INVENTOR.
Robert E. Fearon
BY Charles B. Smith
ATTORNEY

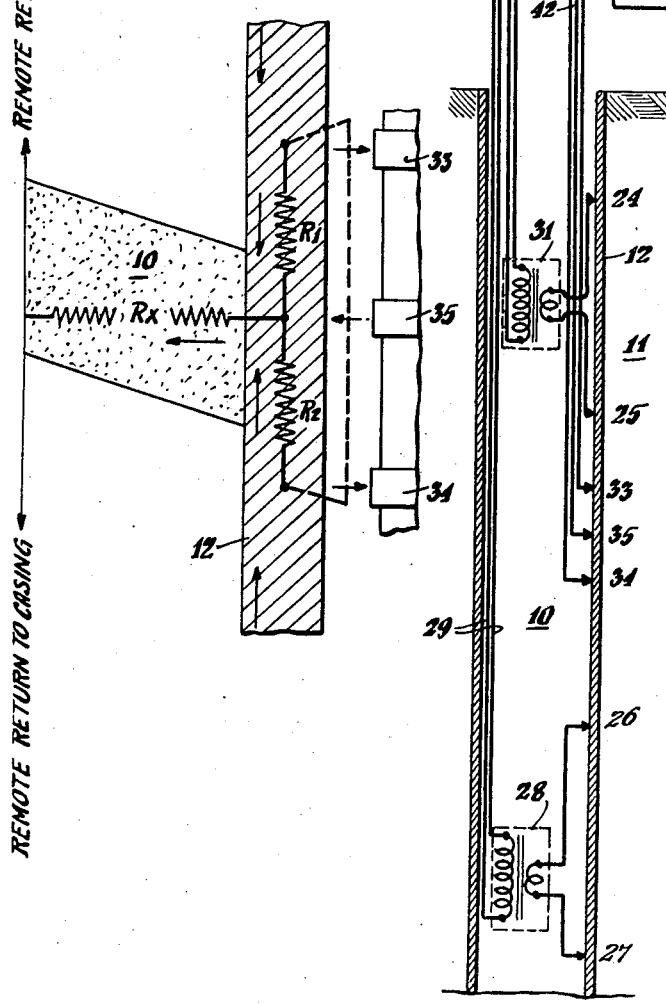

INVENTOR.
Robert E. Fearon

United States Patent Office 2,891,215
Patented June 16, 1959

2,891,215

METHOD AND APPARATUS FOR ELECTRIC WELL LOGGING

Robert E. Fearon, Tulsa, Okla., assignor to Electro Chemical Laboratories Corporation, Tulsa, Okla., a corporation of Delaware Application November 13, 1956, Serial No. 621,572

12 Claims. (Cl. 324—1)

This invention relates generally to the art of geophysical prospecting and more particularly to the art of well logging.

It has long been established in the prior art that electrical methods of well logging which involve measurements of the resistivity of the formation penetrated by the well are systematically related to the occurrence of oil in the pore spaces of the rock. The present invention concerns itself with an electrical method for logging the formations penetrated by a well regardless of whether the well is cased or whether it is filled with highly electrically conductive mud.

As disclosed in Fearon Patent 2,729,784, issued January 3, 1956, electric well logging may be accomplished by causing a flow of alternating current in two longitudinally spaced portions of the casing or mud within the well by spaced pairs of energizing electrodes to effect an elevation of the potential produced in the casing or mud in the region between the portions in which current is caused to flow by the overlapping of the opposing electric fields produced by the current from said pairs of electrodes. A pair of axially spaced exploring electrodes is positioned within the region of elevated potential and so arranged with respect to the spaced pairs of energizing electrodes that the elevated potential at each of these exploring electrodes may be detected and maintained substantially constant by a feedback arrangement. Under such disposition of electrodes and potential distribution a third electrode positioned between the two above mentioned exploring electrodes can be used to indicate or measure the current flowing into or from the formations at that position. This indication or measurement is a function of the conductivity or resistivity of the formations adjacent this exploring electrode.

The method of electric well logging disclosed in the aforementioned Fearon patent is subject to the important disadvantage that the measured quantity is a function not only of the characteristics of the rock formations but also of the thickness and electrical quality of the pipe forming the well casing in the region of the pipe which is in apposition to the exploring electrodes. Thus, if a collar or a thickened zone of pipe occurs in a region of the pipe adjacent to a uniform rock formation, the well log produced will correspond to a greater resistivity in rock formation than is actually the case. Such a variation will not be distinguishable from an actual change of the rock formation itself. In an uncased hole, variations in resistance between exploring electrodes and the edges of the hole will produce similar inaccuracies.

It has accordingly been a principal object of the present invention to provide a novel and improved method and apparatus whereby an electrical log can be made of a drill hole regardless of whether it is cased or filled with a conductive mud.

More particularly, it has been an object of the invention to provide a novel and improved well logging method and apparatus in which errors due to non-uniformities in the thickness and electrical quality of the casing pipe or non-uniformities in the electrode-bore hole contact resistance will be eliminated.

Other and further objects, features and advantages of the invention will become apparent from the following detailed description when taken with the drawings, in which:

Fig. 1 is a diagrammatic illustration of a well surveying operation in accordance with the above mentioned Fearon patent, showing exploring apparatus positioned within a well;

Fig. 2 is a schematic illustration of the approximate potentials existing in the well casing or mud in the region being explored;

Fig. 3 is an equivalent circuit diagram of the current paths established in the vicinity of the exploring electrodes;

Fig. 4 is a schematic electrical wiring diagram illustrating in detail the electrical circuits and probes in relation to a cased drill hole during a well surveying operation conducted in accordance with the above mentioned Fearon patent;

Figure 5:
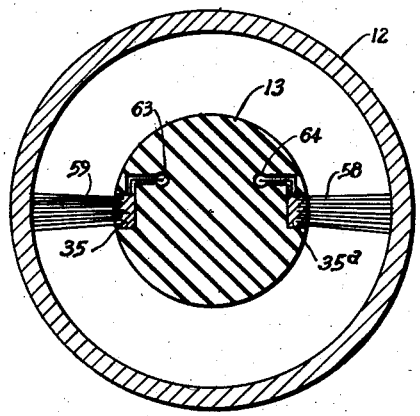
Figure 6:
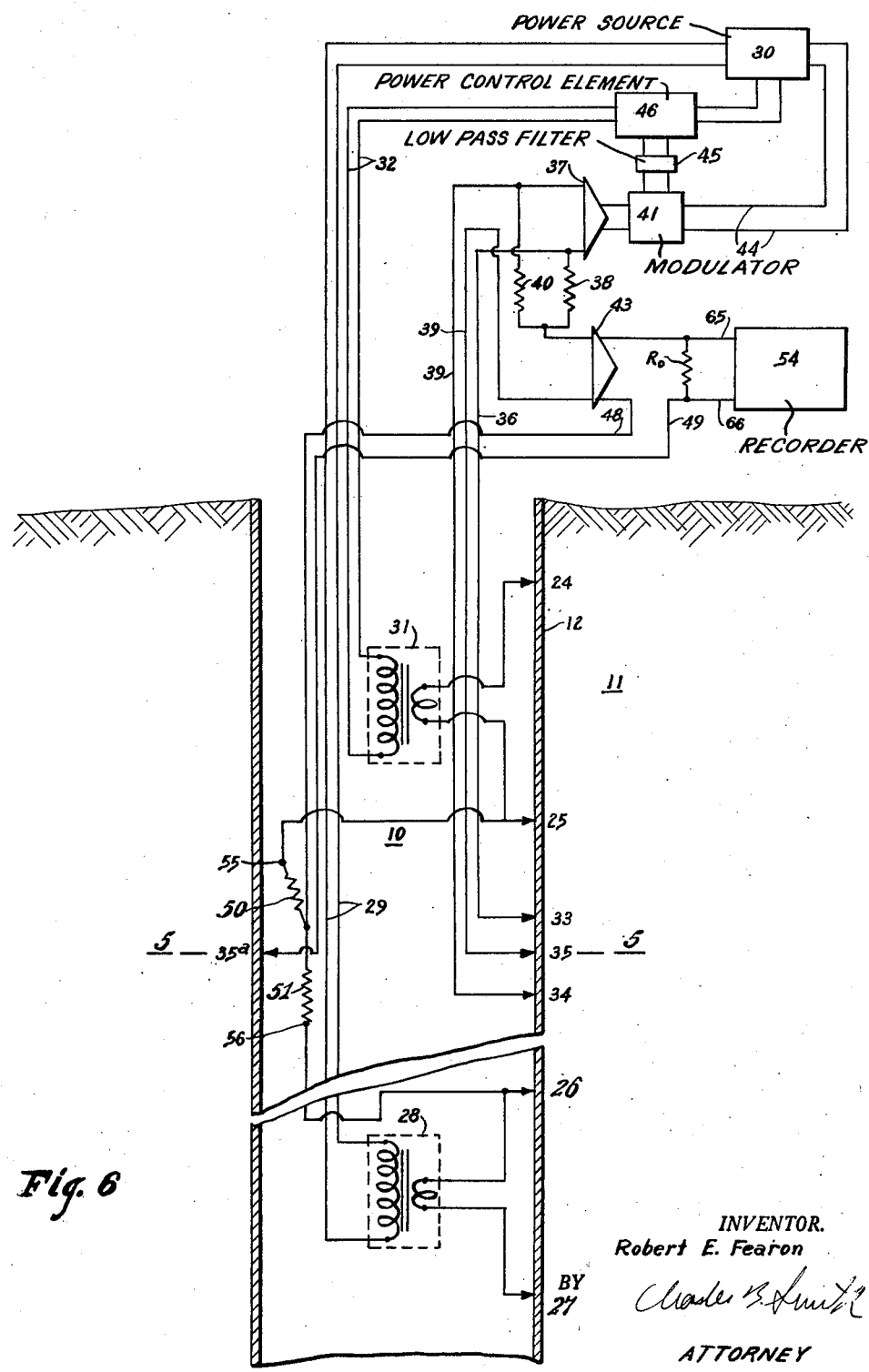

Fig. 5 is a cross-sectional view taken along the line 5—5 of Fig. 6 and illustrating schematically an electrode arrangement within a cased hole, in accordance with the present invention; and Fig. 6 is a schematic electrical wiring diagram illustrating in detail the electrical circuits and probes in relation to a cased hole during a well surveying operation, in accordance with the present invention.

Referring to the drawings in detail, particularly to Fig. 1, there is illustrated an electrical well logging operation. A fragmentary portion of the earth's surface 10 is shown in vertical section. A well 11 provided with a casing 12 penetrates the formations of the earth's surface.

Disposed within the well 12 is a subsurface well logging instrument 13. Instrument 13 is connected to and supported by a cable 14 that is adapted to carry the necessary electrical conductors for delivering power to the subsurface instrument and transmitting signals therefrom to a recorder 15 positioned on the surface of the earth. Recorder 15 may be driven by or in correlation with measuring wheel 16 through a suitable gear box 17 and transmission 18 by means of appropriate shafts. Measuring wheel 16 is adapted to be driven by the cable 14 when the instrument is caused to traverse the well. Cable 14 is adapted to be wound upon a drum 19 that is provided at opposite ends with slip rings 20 whereby electrical connection can be made to the conductors contained in cable 14. Brushes 21 which engage the slip rings 20 are individually connected to conductors which lead to a unit 22 which houses a power supply, amplifiers, and the transducers necessary to the well surveying operation. The output signal from unit 22 is conducted to recorder 15 by the conductors 23 and recorded in correlation with the depth at which the signals originated.

In order to better describe the construction and operation of the apparatus, reference will be made to Figs. 1, 2 and 4. As shown in Fig. 1, the subsurface instrument 13 is provided with bands 24, 25, 26 and 27. These bands are secured to the outer surface of the instrument 13 and are insulated from each other and from the housing of the instrument. The outer surface of the instrument may be coated in its entirety, inside the bands, with electrically insulating material. Bands 24 and 25 serve as electrodes by means of which alternating current can be introduced into that portion of the well casing between the bands. Bands 26 and 27 also serve to introduce alternating current into that portion of the well casing between bands 26 and 27. The manner in which the two pairs of bands comprising bands 24 and 25 and bands 26 and 27 are supplied with power can be readily understood by reference to Fig. 4. Electrodes 26 and 27 are connected to the secondary of a step-down transformer 28 which is disposed within the bottom portion of the housing of instrument 13. The primary of transformer 28 is supplied through the conductors 29 which enter the cable 14 with power from a source 30 located on the surface of the earth but within the unit 22. Electrodes 24 and 25 are connected across the secondary of a second and similar step-down transformer 31, which is also located within the housing of the subsurface instrument 13. The primary winding of transformer 31 is supplied with power through conductors 32 which enter the cable 14 and connect through a power control element 46 to the power supply 30. As pointed out above, the power supply 30 as well as the control element 46 are contained within the unit 22.

In Fig. 2 the curve A'B'C'D' illustrates the electrical potential produced along the well casing 12 when current is caused to flow therein in the manner described immediately above. The points marked A', B', C' and D' correspond to the position of the electrodes 24, 25, 26 and 27 with respect to the casing 12 of the well 11 as illustrated in Fig. 1. The potentials as portrayed by the diagram are those which would exist in a casing possessing uniform electrical resistance per unit of length and for which the effect of current entering or leaving the casing through the adjacent strata has, for the time being, been neglected. As shown by this curve, the potential along the casing linearly increases from the point A' to point B'. The distance from A' to B' along the vertical coordinate of the curve corresponds to the distance between the electrodes 24 and 25 carried by the instrument 13. The curve is drawn as though the electrodes 24 and 25 contact the casing 12 at a point, in each instance. The potential represented by that portion of the curve between C' and D' decreases linearly. The distance over which this decrease occurs corresponds to the distance between the electrodes 26 and 27, which are thought of as being connected at a point, in each instance, to the casing 12. The region of the curve between the points B' and C' corresponds with the potential on the casing lying between electrodes 25 and 26 of the instrument 13. Because of the opposing effects of the currents flowing between the electrode pairs previously described, the electric field and flow of current caused by the pairs approximately vanishes in the zone from B' to C', which corresponds with the section of the casing 12 lying in the region between electrodes 25 and 26 of the instrument 13.

As a result of the potential distribution which has been produced along the casing, the entire zone from A to D and more particularly the zone of the casing from B to C behaves as though it were a separate electrode at a potential with respect to earth which is elevated with respect to the potential of the remaining portion of the casing extending from D downward and from A upward. The virtual electrode thus produced creates in the earth adjacent to the casing a field of electric current flow which may be regarded as consisting of tubes of electric flux emerging perpendicularly from the virtual electrode in the region from B to C, passing through the earth distant from the virtual electrode in curved paths, and returning to the casing remotely. The amount of current emerging from any portion of the casing which lies in the region from B to C will be in general inversely proportional to the resistivity of the adjacent earth. This is more accurately so for strata which are several times thicker than the distance corresponding with the diameter of the casing. Since, as has been mentioned heretofore, resistivity or conductivity of the porous strata of the earth bears a systematic relationship to the occurrence of petroleum, any measurement which will react to the resistivity of the adjacent earth in which the casing lies will be indicative of petroleum.

In order to effect a measurement of the resistivity or conductivity of the porous strata lying adjacent the instrument 13, particularly in that region between electrodes 25 and 26, there are provided in this region three additional electrodes, 33, 34 and 35. These electrodes may be termed probes or exploring electrodes. Electrodes 33 and 34 are respectively spaced substantially equal distances from electrodes 25 and 26. Electrode 35 is positioned substantially midway between the electrodes 33 and 34 and midway in the zone defined by electrodes 25 and 26. As shown in Fig. 4, electrode 33 is connected by conductor 36, which is carried by the cable 14, to one side of amplifier 37 and to resistance 38. Electrode 34 is connected by conductor 39, which is also carried by cable 14, to the other side of amplifier 37 and to one end of resistance 40. With this arrangement any difference in potential existing between electrodes 33 and 34 will be impressed upon the input of amplifier 37. The output of amplifier 37 is conducted to a linear modulator 41 for a purpose to be described later. Electrode 35 is connected through conductor 42, which is also carried by the cable 14, to one side of an amplifier 43. The other side of the input of amplifier 43 is connected to the junction of resistors 38 and 40. Although the potential difference across resistors 38 and 40 in series is made close to zero, the resistance of resistor 38 is preferably equal to that of resistor 40 so that any difference in potential existing between electrodes 33 and 35 and between 34 and 35 will be averaged by the resistors 38 and 40 and their average impressed on the input of amplifier 43. The output of this amplifier is then conducted to the recorder 15. It is desirable to reduce the difference of potential between electrode 33 and electrode 34 as influenced by the adjacent casing to a very small value. To accomplish this, the output of the amplifier 37 is caused to act upon the linear modulator 41. The linear modulator 41 may take the form of a number of linear modulators common and conventional in the field of telephony, such as those described in the article "Copper Oxide Modulators in Carrier Telephone Systems," by R. S. Caruthers, 18 The Bell System Technical Journal 315 (1939). Such linear modulators produce linear modulation, that is, there is linearity between input and output signal amplitudes. Although other apparatus may be used to derive a signal from the output of amplifier 37 which can be fed back to the subsurface current electrodes to reduce the voltage differential between electrodes 33 and 34, the linear modulator is to be preferred. When a linear modulator, such as the so-called ring modulator, is used with both input voltages of the same frequency, among the output modulation products is a direct current voltage directly proportional to the product of the amplitudes of the input voltages. In the apparatus of Fig. 4, a product is formed with a signal derived from the power source 30 through conductors 44. The product so formed contains a direct current component which will have a sign determined by the relative phases of the two above stated inputs. The signal from the power source 30 is normally constant, and therefore the direct current component is directly proportional to the amplitude of the alternating potential between electrodes 33 and 34. The direct current component is isolated by means of the low pass filter 45. This direct current component is used to control the flow of current from the power source 30 through the controller 46 and the conductors 32 to the transformer 31. With this arrangement, the current introduced into the casing 12 by the secondary of transformer 31 can be varied to more nearly balance the potentials on the electrodes 33 and 34. In order to establish this condition the control element 41 may be made a linear modulator which will function on being supplied with direct current from filter 45 to vary the power supply to transformer 31 in a direction that will bring the potentials existing on electrodes 33 and 34 to more nearly the same value. This may be generally described as a negative feedback system.

In operation the instrument 13 is caused to traverse the well 11 by raising or lowering it by means of the drum 19 which is powered by a source not shown. While traversing the well electrode pairs consisting of electrodes 24 and 25 and electrodes 26 and 27 are supplied with energy in the manner described above to cause current to flow in those portions of the casing 12 lying between electrodes 24 and 25 and between electrodes 26 and 27. The current enters the casing from the electrodes by passing through a conductive fluid such as a solution of salt water which may be regarded as filling the casing and surrounding the electrodes. For any wells in which it is inconvenient to fill with salt water, the electrodes 24, 25, 26 and 27 may be regarded as made up of steel brushes which maintain a metallic contact with the casing. The exploring electrodes 33, 34 and 35 may be similarly arranged. This flow of current, as pointed out in connection with the description of Fig. 2, produces potentials along the casing which vary in the manner there described.

Because of the fact that casing 12 is in electrically conductive juxtaposition with the strata of the bore hole in which it is set owing to the presence of fluid in the annular space between it and the bore hole, there is established in the adjacent material of the earth a potential distribution which is related to the potential distribution illustrated in Fig. 2. The nature of this relationship is such that the potential existing in the strata satisfies the equations of electrical flow applicable for a continuous conducting medium, and reduces to the potential distribution of Fig. 2 at the boundary of the casing. Therefore, it may be seen that the potentials as illustrated by the curve of Fig. 2 will cause tubes of electric flux, i.e., current, to emerge from the casing to the adjacent earth in the region from B to C and return to the casing through the earth remotely. Since the electric flux, which emerges in this manner into the earth, comes from the casing, it must enter that portion of the casing either from electrodes immediately adjacent, or, if current electrodes do not exist immediately adjacent the casing, the current which escapes into the strata must necessarily enter the portion of the casing from which it escapes from other nearby portions of the casing.

It is this escaping electric flux that we desire to measure. Totality of these fluxes is represented in the form of current paths through equivalent circuit elements in Fig. 3. Although the electrical resistance of a finite length of casing parallel to the axis is quite small, it is not zero. Accordingly, therefore, that portion of the current entering the casing from above and emerging into the adjacent sandstone passes through a resistance which may be represented as having the value $R_1$. Similarly, that portion of the current which is supplied from below and which emerges into the adjacent formation may be represented as passing through a resistance $R_2$ from the part of the casing lying between the points which are indicated as corresponding with the ends of the resistors. Since means has been provided to reduce the potential of the remote terminals of resistors $R_1$ and $R_2$, and since this means may be made to operate to any desired extent, it is convenient to assume that the differences of potential between the remote ends of these resistors have been made to vanish. The enforcement of this condition is diagrammatically illustrated by the dashed line joining these terminal ends. The current which emerges through the sandstone encounters a resistance $R_x$ which limits the amount so emerging in a determinative manner because $R_x$ is a vastly higher resistance than either $R_1$ or $R_2$. $R_x$ represents the resistance corresponding with a current path emerging from an element of length of the casing in the vicinity of the resistor diagrammatically indicated as $R_x$, and returning to the casing remotely. The current passing through the resistor $R_x$ is a quantitative measure of $R_x$ and is inversely proportional thereto. This is a consequence of Ohm's law. Since the remote terminals of $R_1$ and $R_2$ are maintained at a substantially equal potential, these resistors may be regarded for present purposes as though they were connected together. Accordingly, therefore, the resistance which the current passing through $R_x$ encounters in the nearby portion of the casing may be taken as the resistance of the parallel combination of $R_1$ and $R_2$ which is $$R_{1,2} = \left(\frac{1}{R_1} + \frac{1}{R_2}\right)^{-1}$$

The potential drop thereby observed by means of the system corresponds with the ohmic drop in $R_{1,2}$ corresponding with current flowing through $R_x$. This ohmic drop is represented by the product of the elevation of voltage of that portion of the casing in the region of the probe electrodes by the reciprocal of $R_x$ and by $R_{1,2}$. This product is plotted by the recorder 15 of Fig. 2, and, as may be seen, is inversely proportional to $R_x$. If it is desired to measure resistivity rather than reciprocal resistivity, a suitable computing means may be employed to electrically determine the reciprocal before energizing the recorder.

Methods of the prior art generally related themselves to the measurement of steady potentials produced in the casing by introducing a large direct current at the top. Alternating current was not preferred in such methods because it dies out faster with depth than does direct current. Such methods will be unfavorably influenced by large galvanic currents generated by the action of solutions having varying concentrations of salt in the sequence of strata traversed. The use of alternating current overcomes the defects of such direct current arrangements. The difficulty of transmitting alternating current down the casing is overcome by energizing the casing with alternating current in the close vicinity of the locale of the probe electrodes.

Furthermore, prior to the invention disclosed in the above mentioned Fearon patent, it was always necessary to take derivatives and make computatons of various sorts from the data originally recorded. Interpretations so made are subject to human error, and, since they must be derived from differences of data, are less accurate than the original data.

These objections are overcome by measuring by the three electrode probe system a suitable approximation to the second derivative of potential which is needed to give data about the resistivity or conductivity of the neighboring rock.

Even if the workers of the prior art had used alternating current, and had employed the three electrode probe to take the second derivative of potential, there is yet another error which is reduced to zero by the provision of an arrangement to render electrodes 33 and 34 equipotential. The error in the measurement which is eliminated by this equipotential choice may be understood by reference to Figs. 3 and 4, and the following discussion. The alternating potentials of electrodes 33, 35 and 34 are respectively designated $V_1$, $V_2$ and $V_3$, and correspond with those of wires 36, 42 and 39, respectively, and, in Fig. 3, with the potential of the upper end of resistor $R_1$ and with the junction of $R_1$, $R_2$, and $R_x$ and with the lower end of $R_2$, also respectively. The currents passing through resistors $R_1$, $R_2$ and $R_x$ are designated, respectively, $i_1$, $i_2$ and $i_x$. From the electrical theorem that the algebraic sum of currents going to a point must be zero, $i_1 - i_2 = i_x$ if the positive sense of current in $R_1$ and $R_2$ is downward, and the positive sense of current in $R_x$ is outward.

$$i_1' = i_2' \tag{1}$$

and each represents the algebraic average of current in $R_1$ and $R_2$.

$$i_1'(R_1+R_2) = V_1 - V_3 \tag{2}$$

Additionally, $i_x$ divides into two parts, $$\frac{i_x R_2}{R_1+R_2}$$

which comes down from above through $R_1$ and $$\frac{i_x R_1}{R_1+R_2}$$

which comes up from below through resistor $R_2$ when $V_1-V_3$ is small compared to $V_1$ or $V_3$. Therefore, $$i_1' + \frac{i_x R_2}{R_1+R_2} = i_1 \tag{3}$$

where $i_1$ is the total current in $R_1$ and $$i_1' - \frac{i_x R_1}{R_1+R_2} = i_2 \tag{4}$$

where $i_2$ is the total current in $R_2$.

Now the circuit of Fig. 4 performs the operation $$S = \frac{V_1+V_3}{2} - V_2$$

where S is the recorded value, and $V_1$, $V_2$ and $V_3$ are as defined heretofore.

$$S = \tfrac{1}{2}(V_1-V_2) - \tfrac{1}{2}(V_2-V_3) \tag{5}$$

where $$V_1 - V_2 = i_1 R_1$$
$$V_2 - V_3 = i_2 R_2$$

Using the values of $i_1$ and $i_2$ of Equations (3) and (4)

$$S = \tfrac{1}{2}\left[i_1' + i_x\left(\frac{R_2}{R_1+R_2}\right)\right]R_1 - \tfrac{1}{2}\left[i_1' - i_x\left(\frac{R_1}{R_1+R_2}\right)\right]R_2 \tag{6}$$

regrouping terms:

$$S = \tfrac{1}{2}i_1'(R_1-R_2) + i_x\left(\frac{R_1 R_2}{R_1+R_2}\right) \tag{7}$$

It is to be noted that of the two above terms of the quantity recorded by the circuit of Fig. 4, only the second one is a function of $i_x$, which it is desired to measure. The first term is made zero by the equipotential condition, taking $i_1' = i_2' = 0$, and, as pointed out above, $$i_1'(R_1+R_2) = V_1 - V_3 = 0, \quad V_1 = V_3$$

Since the equipotential condition was not recognized by workers of the prior art, there are, in previous work, large errors related to the first term of Equation (7) whenever $R_1$ is not equal to $R_2$ and the quantity of current proportional to $V_1-V_3$ is great, as will be the case when current is introduced at the top of the casing.

As noted above in Equation (7), the quantity S (without the error $i_1'(R_1-R_2)$), which is amplified by amplifier 43 and registered by recorder 15 of Fig. 4 is a product of two quantities, only one of which, $i_x$, is a property of the rock formations. The other term $$\left(\frac{R_1 R_2}{R_1+R_2}\right)$$

is a property of the thickness and electrical quality of the pipe in the region of the pipe which is in apposition to electrodes 33, 34 and 35. As a consequence of the presence of the second term of the product (in the significant portion of the expression for S as given in Equation (7)), uniform formation will be logged by a curve showing peaks and valleys in accord with the variation of the quality of the pipe encountered in the region of the uniform formation. Among other things, pipe collars will be represented as minima of the curve recorded as representing the value of S of Equation (7) and as maxima if the reciprocal of S is plotted, as has been suggested before. Thus, in the event that a collar or a thickened zone of pipe occurs in a region of the pipe adjacent to a uniform rock formation, the curve formed in accord with the process indicated by the second term of Equation (7) will behave as though the uniform rock formation had exhibited a greater resistivity in the neighborhood of the thickened zone of the pipe. Such a variation will not be distinguishable from an actual change of the formation itself, unless there is made, in addition to the measurement suggested in Equation (7), another measurement intended to determine separately the quantity $$\left(\frac{R_1 R_2}{R_1+R_2}\right)$$

While such a measurement can be made, and a curve showing exclusively the variations of the term $$\left(\frac{R_1 R_2}{R_1+R_2}\right)$$

could be used as a reference to correct the curve for S as shown in Equation (7). Such a procedure is an additional process, and burdensome, unless there is specific desire to determine properties of pipe in the hole.

Figure 3A:
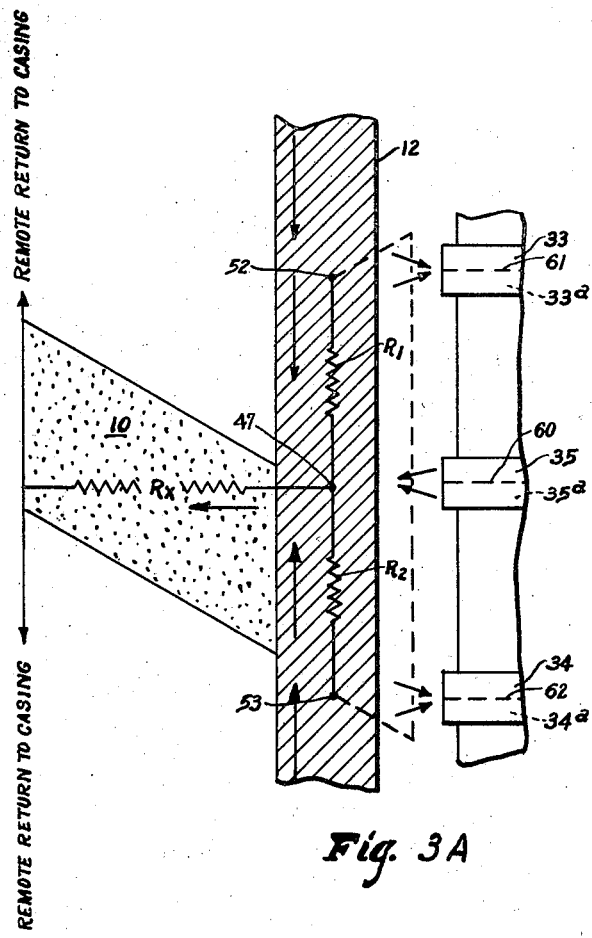
Fig. 3A is an equivalent circuit diagram similar to Fig. 3 but illustrating the principles of the present invention.

In accordance with the present invention, the quantity $i_x$ is directly measured and the necessity of making an additional log to remove the influence of the term $$\left(\frac{R_1 R_2}{R_1+R_2}\right)$$

is avoided. This desirable result is accomplished by supplying one or more additional electrodes in connection with the system generally illustrated in Fig. 3. Fig. 3A shows in an idealized form an arrangement employing one electrode presented in a form to show the relationship to the electrical system heretofore illustrated in Fig. 3. The additional electrode 35a is connected externally to a system adapted to furnish an electrical current which can be controlled in response to the signals delivered from amplifier 43 as shown in Fig. 4. The electric current is made responsive to the output of amplifier 43 in such a manner that whenever there is a potential delivered to amplifier 43, the amplified potential emerging from this amplifier delivers to the electrode 35a a current which opposes the production of the said potential, and tends to nullify and reduce to zero the currents indicated by the arrows as flowing through pipe elements designated as $R_1$ and $R_2$ in Figs. 3 and 3A. When the feedback imposed in this manner is made sufficiently complete, the currents flowing in $R_1$ and $R_2$ may be considered as being nullified, and the current delivered on the electrode 35a may therefore be considered to be exactly equal to the current indicated by the arrow as passing into the rock formation, the electrical resistance of which is designated in Figs. 3 and 3A by the symbol $R_x$. Were it not for the fact that the connection between electrode 35 and the pipe wall has to pass through an uncertain contact between the said electrode and the surface of the pipe, the said uncertain contact resulting in an undetermined and capricious electrical resistance between electrode 35 and the point designated by the numeral 47, in the idealized circuit of Fig. 3A, electrodes 35 and 35a could be combined and would function satisfactorily without the need for separate electrode structures. Unfortunately, while this combining of structures of electrode 35 and 35a is a possibility in principle, the capricious electrical contact resistance as above discussed makes this a practical impossibility. It is therefore necessary to provide separate electrode structures, insulated from one another, and to provide arrangements whereby these separate electrode structures can contact the pipe through separate and electrically distinct means. Since it is necessary that the contacts of both the electrodes occur at the same vertical point on the pipe, and since, obviously, two electrodes cannot be separate and occupy identically the same space, it is considered that these electrodes will be separated by a space which is separated by a negligible distance in an axial direction compared with the axial distance between electrodes 33 and 35 and electrodes 35 and 34, or that contact at the same vertical point will be secured by providing electrodes insulated from one another but adjacent, and coming out on opposite sides of the logging instrument, the electrode coming out on one side being the electrode 35 and the electrode coming out on the opposite side and touching the interior of the pipe at a point diametrically opposite to the point touched by electrode 35 will be electrode 35a. Fig. 5 illustrates the manner in which this arrangement is accomplished.

Figure 3B:
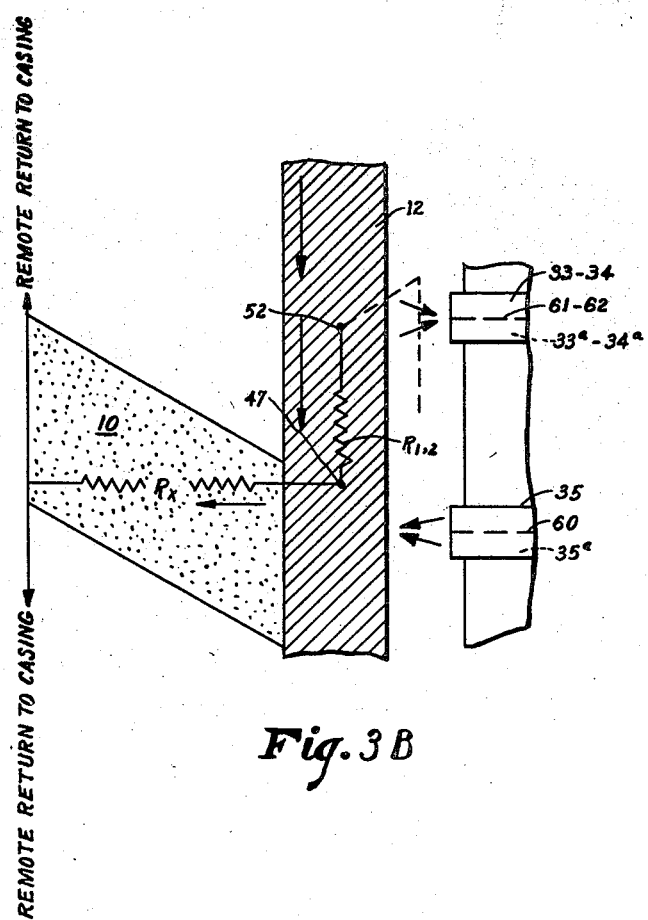
Fig. 3B is a simplification of the circuit diagram of Fig. 3A.

In Fig. 6, there is shown the manner in which electrode 35a is energized by the amplifier 43 through additional wires 48 and 49, which are employed to energize the feedback system as shown in Fig. 6. The wire 48 delivers the return flow of current from electrode 35a equally through electrodes 33 and 34, the equalization being brought about by the use of resistors 50 and 51. In a region in which the values of $R_1$ and $R_2$ as indicated in Figs. 3 and 3A differ from the values for other parts of the pipe but are equal to each other, the equal currents passed in opposition to those flowing in these portions of the pipe from electrode 35a to electrode 33 and from electrode 35a to electrode 34 can exactly cancel the currents originally present in these portions of the pipe as designated in Fig. 3. In such a case, the condition for measuring $R_x$ is exactly met, and the current flowing through wires 48 and 49 is exactly equal to the current flowing in $R_x$. In the case where $R_1$ and $R_2$ are not exactly equal, the effect is still the same, for the reason that owing to the feedback shown in Fig. 4 which reduces the potential of electrodes 33 and 34 to the same value, it is possible to consider $R_1$ and $R_2$ electrically as though they were connected together at their extremities, designated by points 52 and 53 in Fig. 3A. In such a case the diagram of Fig. 3A can, for the purpose of this discussion, be redrawn as shown in Fig. 3B, where the diagrammatic equivalent of circuit 3A has only one branch path for current at circuit point designated 47. This path is designated as $R_{1,2}$, and the feedback current delivered by wires 48 and 49 annuls exactly the total current branching through $R_{1,2}$, thereby eliminating it and making the current delivered on electrode 35a equal to the current passing into the formation through $R_x$.

Since, as explained, the current passing on wire pair 48 and 49 is maintained equal to the current $i_x$ flowing through the formation 10 in Figs. 3 and 3A, a value representing the conductivity of the rock formation is obtained by passing the said current through a resistor $R_0$ shown in Fig. 6 across the terminals of which a potentiometric recorder is connected. The potential drop in the resistor $R_0$ is equal to $R_0 i_x$ and is represented versus depth on the potentiometer recorder 54, in a manner exactly similar to the arrangement of recorder 15 in Fig. 1. The operator may record the reciprocal of $R_0 i_x$ instead of the direct quantity, using a suitable recorder. With reciprocal recording, a direct measure of the resistivity of the rock formation designated by numeral 10 in Figs. 3 and 3A is obtained. Special return current electrodes may be provided in the manner exactly the same as was illustrated for electrodes 35 and 35a in Fig. 5. The electrodes 33a and 34a shown in Fig. 3A may then be used as return points for the current transmitted on wire 48 through resistors 50 and 51.

There is another desirable alternative method of delivering the return current from feedback electrode 35a to complete that feedback circuit. This alternative consists in differently connecting the resistors 50 and 51 of Fig. 6 at their terminals 55 and 56, to terminals 25 and 57, respectively, as shown in Fig. 6. Other alternatives may also be used to take care of the return current. The terminals above mentioned may be connected, in the order named, to C and B, respectively, of Fig. 1, instead of being connected as above mentioned. Also, the same terminals may be connected to A and C, respectively, or the inverse order (in Fig. 1). In fact, the two branches of the return current may be connected to any two electrodes applied to the pipe, one above and one below electrodes 35a of Fig. 3A and Fig. 6. There is only the requirement that the return electrodes must be spaced above and below electrode 35a by a distance equal to or greater than the distance of the electrodes 33 and 34 of Fig. 3A from the electrode 35a.

There follows a mathematical analysis of the behavior of the system containing the added feedback feature, delivering current over electrode 35a, as shown in Fig. 3A and Fig. 6.

The network consisting of electrodes 33 and 34, connected to resistors 38 and 40, causes the potential received at the input of amplifier 43 of Fig. 4 and Fig. 6 to represent one half the sum of the potentials of electrodes 33 and 34. If the point on the pipe touched by electrode 35 is taken as the reference point of potential, the potential of electrode 33 due to the feedback current delivered on electrode 35a of Fig. 3A is ½ $i_F R_2$. Similarly, the potential due to feedback current $i_F$ delivered at electrode 35a is ½ $i_F R_2$ on electrode 34. (Remembering that feedback current divides equally at 35a due to relatively large resistors 50 and 51 in the two branches of the return path for the feedback current delivered at 35a.) Therefore, remembering the effect of the network containing resistors 38 and 40 of Fig. 4, the potential due to feedback current delivered to electrode 35a of Fig. 3B by the circuit of Fig. 6 is:

$$\frac{\tfrac{1}{2}i_F R_1 + \tfrac{1}{2}i_F R_2}{2}$$
$$= \begin{pmatrix}\text{Change in potential S due to feed-}\\ \text{back current delivered to electrode 35a}\end{pmatrix}$$

but the new feedback arrangement of Fig. 6 makes $S=0$. Therefore, from Equation 7 and the above, $$S = i_x\left(\frac{R_1 R_2}{R_1 + R_2}\right) + \frac{\tfrac{1}{2}i_F R_1 + \tfrac{1}{2}i_F R_2}{2} = 0$$

remembering that the feedback is negative. If $R_1 = R_2$, the above reduces to $i_x = i_F$ showing that we assumed negative feedback in setting $S=0$ (current outward from 47 is defined as being positive).

Further with respect to the mathematical treatment of Fig. 3A, to treat the general case in which $R_1$ is not equal to $R_2$ and the current is unequally divided, and imposing both sources of feedback concurrently, it is apparent that the feedback conditions result in electrodes 33 and 34 and 35 all being maintained at the same potential. Therefore, net currents in $R_1$ and in $R_2$ are both zero by Ohm's law. Accordingly, since no current is diverted from the path through the point 47 in Fig. 3A by branch paths through $R_1$ and $R_2$, the current $i_x$ is equal to the current received from 35a, the only source, in view of the requirement of continuity of electrical current in networks.

The wire brushes 58 and 59 shown in Fig. 5 are illustrated as being insulated from one another. The insulation which is indicated is necessary, and must be of good quality for the satisfactory function of the system as applied to the problem of logging in a cased hole. For logging problems other than cased holes, the insulation requirement is not so critical and the immersion of the electrodes in the fluid of the borehole is, in general, not hurtful. To return to the procedure of logging a cased hole, where the insulation is critical, the assembly illustrated in Fig. 5 is intended to be employed in a casing which is either empty (air serving as the insulator) or filled with oil of suitable electrical insulating quality. If it is essential that the casing be filled with electrically conductive liquid, guard electrodes surrounding the brush electrodes and coming close to the pipe are necessary.

These are not illustrated, since in general it is possible to operate with a pipe full of oil, which is more convenient.

The equipment shown in Fig. 6, as indicated, comprises a very considerable number of conductors in the cable extending down the borehole. The large number of conductors illustrated in Fig. 6 may be avoided by putting the electronic equipment in the portion of the apparatus which descends into the borehole and enclosing it in suitable protective housings. In fact, if appropriate battery power sources are employed, all the equipment may be lowered into the borehole with the exception of the recorder 54 (which, as shown in Fig. 1, is arranged to record versus depth). In the above arrangement for putting the electronic gear down in the borehole instrument itself, the only wires that need be brought to the surface in the cable will be wires 65 and 66 shown in Fig. 6. With cased holes having exceptionally thick casing offering a very low electrical resistance, for good measurements brushes 58 and 59, and any and all other brush electrodes similarly provided, should have a considerable number of bristles which concurrently contact the pipe, and should be arranged to contact the pipe with a considerable amount of pressure and over an appreciable area to provide a good connection to the pipe wall. Besides the above requirement for convenient operation of the invention in thick or extremely conductive pipe, it is worthwhile to note that the problem of amplification (as in amplifiers 37 and 43 of Fig. 6) is best met by producing at the input of each amplifier a very substantial impedance transformation using an electromagnetic type of transformer with a high turns ratio. This is of great help, because it magnifies very much the otherwise extremely small voltages which are received from electrodes applied to the pipe without mismatching the input impedance of the electronic portion of the amplifying means.

With reference to Fig. 3A, it is to be noted that this figure is extremely diagrammatic. The arrows extending to and from the pipe are simply symbolic expressions of the fact that the electrodes illustrated are in contact with or electrically connected to the pipe. The direction of the arrows does not necessarily illustrate the direction of the current. Further, the dotted lines 60, 61 and 62 are symbolic of the fact that the electrodes separated by the dotted lines are insulated one from the other and are not intended to suggest the geometric character of the insulation which, on the contrary, is illustrated in one specific form in Fig. 5.

Fig. 5 shows a plastic body 13 within a casing 12. Embedded in the plastic body are electrodes 35 and 35a to which wire brush assemblies 59 and 58, respectively, are mounted. Vertical electric conduits 63 and 64 are provided with conductors to carry the current or other electrical indications of electrodes 35 and 35a. These conduits represent canals extending in a direction perpendicular to the paper as it appears in Fig. 5.

In Fig. 6 the return path for the feedback current delivered on wire 48 was chosen to correspond with the arrangement wherein the two branches of this current are connected to electrodes 25 and 27 (B and C of Fig. 1). The section line 5—5 of Fig. 6 is designated perpendicular to the axis of the casing to depict clearly that electrodes 35 and 35a are at the same vertical position, through contacting opposite "sides" of the pipe.

It is to be understood that other modifications of the instant invention will become apparent to those skilled in the art and that the invention is to be restricted only by the appended claims.

What is claimed is:

1. A method of measuring the electrical resistivity of rock formations adjacent to a boring penetrating the earth and which contains an electrically conductive medium, comprising introducing first and second electrical currents into respective axially spaced locations in said medium, said first and second electrical currents having substantial opposite axial components thereby to maintain the portion of said medium bounded by said locations at an electrical potential other than zero, detecting any difference in potential between first and second axially spaced positions in a small intermediate region of said portion, employing said difference in potential to adjust the magnitude of one of said first and second electrical currents so that the axial ends of said small intermediate region of said portion are maintained at equal potentials, supplying a third electrical current to a third position in said region, detecting any difference in potential between two axially spaced places in said region at least one of which is axially spaced from said first and second positions, employing said last mentioned difference in potential to adjust the magnitude of said third electrical current so that the center of said region is at the same potential as said ends thereof, and measuring the magnitude of said third electrical current as a measure of the electrical resistivity of the rock formation adjacent to said region.

2. A method of measuring the electrical resistivity of rock formations adjacent to a borehole from within a metallic casing lining said borehole, comprising the steps of producing in said casing a relatively extended region having an electrical potential greater than zero, supplying an electrical current to a relatively small middle portion of said region, detecting any difference in potential between a pair of axially spaced locations in said middle portion, employing any such difference to adjust the electrical potential of said region so that the axial ends of said middle portion are equipotential, detecting any difference in potential between two axially spaced places in said middle portion at least one of which is axially spaced from both of said locations, employing said last mentioned difference in potential to maintain said supplied electrical current at a value such that the net current flowing in an axial direction in said intermediate portion of said casing and outward from the center point of said portion is zero, and measuring the value of said supplied electrical current as a measure of the resistivity of the rock formation adjacent to said intermediate portion of said casing.

3. A method of measuring the electrical resistivity of rock formation adjacent to a borehole from within a metallic casing lining said borehole, comprising the steps of supplying first and second electrical currents to respective axially spaced locations in said casing to maintain the portion of said casing bounded by said locations at an electrical potential greater than zero, detecting any difference in potential between first and second axially spaced positions located at opposite axial ends of an intermediate region of said portion, employing any such difference in potential to adjust the magnitude of one of said first and second electrical currents so that the axial ends of said intermediate region are maintained at equal potentials, supplying a third electrical current to the center of said region, detecting any difference in potential between said positions and the center of said region, employing said last mentioned difference in potential to adjust the magnitude of said third electrical current so that the net current flowing in an axial direction in said region of said casing and thence outward from the center point of said portion is zero, and measuring the value of said third electrical current as a measure of the resistivity of the rock formation adjacent to said region of said casing.

4. A method of making an electric log of the formations adjacent a well which contains an electrically conductive medium, that comprises introducing a first electrical current between a first pair of axially spaced positions bounding a first portion of said electrically conductive medium in a manner such that said first electrical current will have a substantial axial component, separately introducing a second electrical current between a second pair of axially spaced positions bounding a second portion axially spaced from said first portion of said electrically conductive medium in a manner such that said second electrical current will have a substantial axial component opposite to said axial component of said first electrical current, whereby the flow of the axial components in opposite directions will create on a pair of axially spaced locations in the region between said portions substantially equal potentials different from the potential of any given reference point located in remote portions of said electrically conductive medium, introducing a third electrical current into said medium at a location intermediate said axially spaced locations, detecting any difference in potential between two axially spaced places in said region at least one of which is axially spaced from both of said axially spaced locations, employing said difference in potential to maintain said third electrical current at a value such that said medium will be maintained equipotential between said pair of axially spaced locations, and measuring said third electrical current as a function of the electrical resistivity of the rock formation adjacent to said region.

5. A method of making an electric log of the formations adjacent a well which contains an electrically conductive medium, that comprises introducing a first electrical current between a first pair of axially spaced positions bounding a first portion of said electrically conductive medium in a manner such that said first electrical current will have a substantial axial component, separately introducing a second electrical current between a second pair of axially spaced positions bounding a second portion axially spaced from said first portion of said electrically conductive medium in a manner such that said second electrical current will have a substantial axial component opposite to said axial component of said first electrical current, whereby the flow of the axial components in opposite directions will create on a pair of axially spaced locations in the region between said portions substantially equal potentials different from the potential of any given reference point located in remote portions of said electrically conductive medium, introducing a third electrical current into said medium at a location intermediate said axially spaced locations, detecting any difference in potential between two axially spaced places in said region at least one of which is axially spaced from both of said axially spaced locations, employing said difference in potential to maintain said third electrical current at a value such that the net current flowing in an axial direction between said pair of axially spaced locations and toward said intermediate location will be zero, and measuring said third electrical current as a function of the electrical resistivity of the rock formation adjacent to said region.

6. A method of making an electric log of the formations adjacent a well which contains an electrically conductive medium, that comprises introducing a first electrical current between a first pair of axially spaced positions bounding a first portion of said electrically conductive medium in a manner such that said first electrical current will have a substantial axial component, separately introducing a second electrical current between a second pair of axially spaced positions bounding a second portion axially spaced from said first portion of said electrically conductive medium in a manner such that said second electrical current will have a substantial axial component opposite to said axial component of said first electrical current, whereby the flow of the axial components in opposite directions will create on a pair of axially spaced locations in the region between said portions substantially equal potentials different from the potential of any given reference point located in remote portions of said electrically conductive medium, determining the difference in potential between the average of the potentials of said axially spaced locations and the potential of a location intermediate said axially spaced locations, deriving a third electrical current proportional to said difference in potential, introducing said third electrical current into said medium between said location intermediate said axially spaced locations and a pair of spaced points in said medium at least as remote from said intermediate location as said axially spaced locations, said third electrical current being introduced in a sense to reduce said potential difference to zero, and measuring said third electrical current as a function of the electrical resistivity of the rock formation adjacent to said region.

7. Apparatus for making an electrical log of the formations adjacent a well which contains an electrically conductive medium, comprising a source of electrical current, a first pair of axially spaced current electrodes, means for introducing a first electrical current between said first pair of current electrodes bounding a first portion of said electrically conductive medium in a manner such that said first electrical current will have a substantial axial component, a second pair of axially spaced current electrodes axially spaced from said first pair of current electrodes, a pair of axially spaced exploring electrodes in the region between said first and second pairs of current electrodes, separate means for introducing a second electrical current between said second pair of current electrodes bounding a second portion axially spaced from said first portion of said electrically conductive medium in a manner such that said second electrical current will have a substantial axial component opposite to the axial component of said first electrical current, whereby the flow of the axial components in opposite directions will create substantially equal potentials on said exploring electrodes different from the potential of any given reference point located in remote portions of said electrically conductive medium, third and fourth exploring electrodes insulated from each other and arranged to contact said medium at an axial position midway between said pair of exploring electrodes, means to produce a third electrical current proportional to the average of the potential difference between said pair of exploring electrodes and said third exploring electrode, means to apply said third electrical current to said medium between said fourth exploring electrode and points in said medium at least as remote as said pair of exploring electrodes, said third electrical current being applied to said medium in a sense to reduce said potential difference to zero, and means for measuring said third electrical current as a function of the electrical resistivity of the rock formation adjacent to said region.

8. Apparatus for making an electrical log of the formations adjacent a well which contains an electrically conductive medium that comprises a source of electrical current, a first pair of axially spaced current electrodes, means for introducing a first electrical current between said first pair of current electrodes bounding a first portion of said electrically conductive medium in a manner such that said first electrical current will have a substantial axial component, a second pair of axially spaced current electrodes axially spaced from said first pair of current electrodes, a pair of axially spaced exploring electrodes in the region between said first and second pairs of current electrodes, separate means for introducing a second electrical current between said second pair of current electrodes bounding a second portion axially spaced from said first portion of said electrically conductive medium in a manner such that said second electrical current will have a substantial axial component opposite to the axial component of said first electrical current, whereby the flow of the axial components in opposite directions will create substantially equal potentials on said exploring electrodes different from the potential of any given reference point located in remote portions of said electrically conductive medium, third and fourth exploring electrodes insulated from each other and arranged to contact said medium at an axial position midway between said pair of exploring electrodes, means to produce a third electrical current proportional to the average of the potential difference between said pair of exploring electrodes and said third exploring electrode, means to apply said third electrical current to said fourth exploring electrode in a sense to reduce said potential difference to zero, the return path for said third electrical current including a pair of points in said medium spaced in opposite axial directions from said fourth exploring electrode an axial distance at least as great as the spacing between said fourth exploring electrode and said pair of exploring electrodes, said points in said return path being coupled to a common point in the source of said third electrical current, and means for measuring said third electrical current as a function of the electrical resistivity of the rock formation adjacent to said region.

9. Apparatus as set forth in claim 8 in which said points in said return path coincide with said first and second exploring electrodes, respectively.

10. Apparatus as set forth in claim 8 in which said points in said return path coincide with a corresponding current electrode in each of said pairs, respectively.

11. Apparatus as set forth in claim 8 in which said points in said return path are formed by separate electrodes.

12. Apparatus as set forth in claim 8 in which each of said points in said return path is connected to said common point through a respective resistor.

References Cited in the file of this patent

UNITED STATES PATENTS

| | | |
|---|---|---|
| 2,388,896 | Aiken | Nov. 13, 1945 |
| 2,712,631 | Ferre | July 5, 1955 |
| 2,729,784 | Fearon | Jan. 3, 1956 |
| 2,770,771 | Schuster | Nov. 13, 1956 |